United States Patent [19]
Belt et al.

[11] Patent Number: 5,759,707
[45] Date of Patent: Jun. 2, 1998

[54] FLUX-COATED METAL COMPONENTS

[75] Inventors: Heinz-Joachim Belt, Burgwedel; Ruediger Sander, Sehnde; Werner Rudolph, Hanover, all of Germany

[73] Assignee: Solvay Fluor und Derivate GmbH, Hanover, Germany

[21] Appl. No.: 726,432

[22] Filed: Oct. 4, 1996

[30] Foreign Application Priority Data

Oct. 6, 1995 [DE] Germany ............... 195 37 216.6

[51] Int. Cl.[6] ............... B23K 1/20; B22K 7/04
[52] U.S. Cl. ............... 428/552; 428/553; 428/469; 419/8; 419/9; 419/10; 148/528; 228/111.5
[58] Field of Search ............... 419/8, 10, 9; 428/552, 428/553, 469; 148/528; 228/111.5

[56] References Cited

U.S. PATENT DOCUMENTS

| | | |
|---|---|---|
| 4,579,605 | 4/1986 | Kawase et al. |
| 4,723,597 | 2/1988 | Sonoda. |
| 4,781,320 | 11/1988 | Fujiyoshi. |
| 5,100,048 | 3/1992 | Timsit. |
| 5,171,377 | 12/1992 | Shimizu et al. |
| 5,190,596 | 3/1993 | Timsit. |
| 5,428,920 | 7/1995 | Levin. |

FOREIGN PATENT DOCUMENTS

| | | |
|---|---|---|
| 552567 | 7/1993 | European Pat. Off. |
| 4339498 | 5/1995 | Germany. |
| 94/1692 | 3/1994 | South Africa. |

*Primary Examiner*—Daniel J. Jenkins
*Attorney, Agent, or Firm*—Evenson, McKeown, Edwards & Lenahan P.L.L.C.

[57] ABSTRACT

Metal structures, e.g. coolers or heat exchangers, can be produced by placing together metal components coated with solder, dipping them into a slurry of a flux, and soldering them by heating. Alternatively, components coated with solder can also be coated with flux, then placed together to form the metal structure and soldered by heating. In this case, however, the flux must be applied so as to adhere securely, and to this end in the prior art the flux has been "glued on" to the metal surface by organic or other binders, which when burned out during the soldering process can produce undesirable exhaust gases or emissions. The present invention discloses a metal component which is provided with a sintered flux coating which adheres without binder. The coating can optionally also contain solder metal or other auxiliaries dispersed therein. The coating is applied, for example, by contacting the metal component with a binder-free slurry of the flux or dry coating the metal component electrostatically, and then heating the coated component while avoiding melting of the flux, so that an adherent sintered flux coating is formed on the metal component. The use of these coated metal components for the production of soldered metal structures and metal structures obtained using such components are also described. Potassium fluoroaluminate flux is particularly advantageously used.

15 Claims, No Drawings

FLUX-COATED METAL COMPONENTS

BACKGROUND OF THE INVENTION

This invention relates to novel metal components coated with flux, to their production and their use for producing soldered metal structures.

One method of producing metal structures from metal components joined together is furnace soldering. In this method, the metal components are joined at a temperature above, for example, 500° C. with the aid of a molten added metal, known as a solder. In soldering, oxides and other interfering cover layers on the metal surface are a problem. The surface must be metallically clean so that a perfectly satisfactory soldered joint is produced. Fluxes, which are usually brushed or sprayed on or applied to the component as a solder covering, are used for this purpose.

Fluxes composed of potassium salts of fluoroaluminates are particularly suitable, e.g. for the hard soldering of lightweight metal materials such as aluminum, since they are non-corrosive and non-hygroscopic. Especially suitable examples include mixtures of potassium tetrafluoroaluminate and tripotassium hexafluoroaluminate or alternatively mixtures of potassium tetrafluoroaluminate and dipotassium pentafluoroaluminate; the latter compound may optionally be in hydrated form.

In order to produce the metal structure, the metal components which have already been coated with solder are placed together, dipped into a slurry of a flux, and then are soldered by heating. The flux melts and cleans the surface, and the solder produces the soldered joint. The disadvantage of the method described here is that not only those regions of the metal components which are to be soldered are coated, but also the other surface areas. As a result, the function of the metal structure may be adversely affected. For example, in coolers the heat exchange capacity of lamellae which have been surface-coated in such a manner can be reduced.

Another method provides for coating with solder and flux only those regions of the metal components which are to be soldered together by contact with each other. In order to achieve this, the flux must be applied so as to adhere securely. For this purpose, it is glued to the metal surface by means of an organic binder or other suitable binder. Upon heating during soldering, the binder, which usually is organic, burns out and in so doing forms waste gases in the form of decomposition products which may be harmful to health.

SUMMARY OF THE INVENTION

It is an object of the present invention to provide metal components, e.g. pipes, fins and frames for radiators, which are not subject to the aforementioned disadvantages of the prior art when being soldered.

This object has been achieved in accordance with the present invention by providing a metal component having a binder-free, adherent, sintered flux coating thereon.

The metal component according to the invention is characterized in that it has a sintered flux coating which adheres without binder. In principle, the metal component may comprise any desired fluxes which are known to be applied to metal and which will adhere by sintering. Suitable fluxes are those that do not loose their fluxing properties to a significant extent during sintering. Inorganic fluxes, in particular those composed of one or more potassium salts of fluoroaluminates, are highly suitable. These may be potassium salts of tetrafluoroaluminates, pentafluoroaluminates, hexafluoroaluminates, hydrates thereof or mixtures of one or more of the aforementioned fluoroaluminates.

Metal components which have a flux coating composed of potassium tetrafluoroaluminate and/or dipotassium pentafluoroaluminate or a hydrate thereof are preferred. Metal components coated with fluxes based on a mixture of potassium tetrafluoroaluminate and dehydrated dipotassium pentafluoroaluminate are particularly preferred. It is especially preferred to use a flux composed of a mixture of potassium tetrafluoroaluminate and irreversibly dehydrated dipotassium pentafluoroaluminate. A most especially preferred flux of this type based on irreversibly dehydrated dipotassium pentafluoroaluminate is disclosed in co-pending U.S. patent application Ser. No. 08/590,636 (=DE 195 19 515), the disclosure of which is incorporated herein by reference. In order to produce such a flux, hydrated or reversibly dehydrated dipotassium pentafluoroaluminate is heated for a sufficient time at such a temperature that the hydrate or the reversibly dehydrated starting material is converted at least partially into the irreversibly dehydrated product. Advantageously, this temperature is above 265° C., in particular at or above 300° C. Conventional fluxes composed of potassium salts of complex fluoroaluminates can then be admixed with the irreversibly dehydrated dipotassium pentafluoroaluminate. Alternatively, it is possible to start from mixtures which already contain the hydrate or reversibly dehydrated dipotassium pentafluoroaluminate, and then to heat-treat the mixture. For instance, according to Willenberg, U.S. Pat. No. 4,428,920, or Kawase, U.S. Pat. No. 4,579,605, a mixture of potassium tetrafluoroaluminate and hydrated dipotassium pentafluoroaluminate can be produced and then this mixture can be irreversibly dehydrated at a temperature of preferably 265° C. or higher. An excellent solder is then produced which contains potassium tetrafluoroaluminate and irreversibly dehydrated dipotassium pentafluoroaluminate. Such a preferred flux firstly adheres very well to the metal components, and secondly effects excellent flowing of the solder on the surface of the metal component.

A highly suitable flux composed of potassium salts of fluoroaluminates contains in each case 0 to 100% by weight potassium tetrafluoroaluminate, dipotassium pentafluoroaluminate in the form of the hydrate or as reversibly or irreversibly dehydrated product, and/or tripotassium hexafluoroaluminate. Furthermore, it may contain solder metals or other auxiliaries, such as modifying metals like Cu as described in published PCT Application No. WO 92/12821.

An especially preferred flux contains (before sintering) 60 to 90% by weight potassium tetrafluoroaluminate, 10 to 40% by weight irreversibly dehydrated dipotassium pentafluoroaluminate, reversibly dehydrated dipotassium pentafluoroaluminate and/or the monohydrate of dipotassium pentafluoroaluminate, and 0 to 10% by weight tripotassium hexafluoroaluminate. Furthermore, it may also contain a desired amount of auxiliaries such as solder metal (e.g. up to 5% by weight or more). The dipotassium pentafluoroaluminate is preferably contained in irreversibly dehydrated form.

The solder metal is advantageously either contained in the flux coating or is arranged as a solder coating between the flux coating and the metal component.

A good flux which can be used which contains the solder metal and optionally further metals as auxiliaries is described in U.S. Pat. Nos. 5,100,048 and 5,190,596 (=WO 92/12821), the disclosures of which are incorporated herein by reference. A particularly suitable flux with a solder metal content is described in the aforementioned U.S. Pat. Application Ser. No. 08/590,636 (=DE 195 19 515), incorporated herein by reference. According to the teaching of WO 92/12821, a metal which is advantageously in finely powdered form, for example in the form of particles having a size of less than 1000 μm, can be admixed with the flux. A particularly suitable solder metal is silicon, and copper and germanium are also highly suitable. For example, according to the teaching of WO 92/12821, a flux can be used which contains 10 to 500 parts by weight finely powdered solder metal per 100 parts by weight of the fluoroaluminum compounds. In addition, additional metals which modify the surface properties of the soldered parts or the resulting eutectic can also be admixed as auxiliaries in finely powdered form with the flux. Thus finely powdered iron, manganese, nickel, zinc, bismuth, strontium, chromium, antimony or vanadium can be admixed therewith.

The teaching of WO 92/12821 is modified in copending U.S. patent application Ser. No. 08/590,636 (=DE 195 19 515) such that the solder metal is contained in the special flux, which permits uniform coating, adheres very readily to the metal workpiece after sintering, and results in an excellent flow of the solder.

Of course, the metal component may be completely coated with the flux which optionally contains solder metal or other auxiliaries. After sintering, as stated the flux adheres very well to the metal component, so that the metal component with the sintered flux can be handled readily.

It is particularly preferred not to coat with the flux part or all of those surface areas of the metal component which are not the soldering points which after soldering result in the secure joining of the various metal components. To this end, the flux is applied specifically to the corresponding soldering points, for instance by spraying or brushing on, so that the other regions of the metal component which are not necessary for the soldering operation proper are not coated with the flux or mixtures thereof.

The production of the metal components which are coated with the sintered flux will be described below. First of all, the respective metal component is contacted with the binder-free flux. "Dry" methods can be used for this purpose. For instance, the flux can be applied electrostatically as a powder. Advantageously, aqueous slurries are used. The slurry desirably may contain 3 to 60% by weight of the flux plus water and any impurities, which make it up to 100% by weight. The contacting can be effected, for example, by partial or complete dipping into the slurry, or by brushing or spraying the slurry onto the entire metal component or certain regions thereof. The metal component is then heated, so that a sintered, adhering, binder-free flux coating is formed on the metal component, with melting of the flux being avoided by remaining below the melting temperature of the flux. Good results are achieved if sintering is effected in a temperature range which lies from 70° C. below the melting point of the flux or higher, up to e.g. 3° C. below the melting point. The time suitable for sintering depends on the temperature at which sintering is carried out, and also on the flux used in each case. The optimum time can be readily determined by simple small-scale tests. Usually, the time required for sintering lies within a range of 10 to 120 seconds. The temperature in the furnace may also be above the melting point of the flux. Then the residence time should be made so short that the flux does not completely melt.

The metal components according to the invention are outstandingly suitable for the production of soldered metal structures, e.g. coolers, radiators and heat exchangers To this end, the sintered metal components are fitted together and heated, so that the flux and the solder used melt and result in the soldering of the components. The soldering is advantageously carried out in a soldering furnace, in which case it is possible to operate under an air atmosphere or in an inert gas atmosphere such as nitrogen.

The invention also includes metal structures which are obtained by soldering the metal components according to the invention, in particular using metal components which have a sintered coating of the soldering flux only at the soldering points.

The metal components according to the invention have the advantage that they have a flux layer which is applied so as to adhere securely, without a binder being required for this purpose. Metal components according to the invention which are coated only or substantially only at the soldering points are particularly advantageous.

The following examples are intended to illustrate the invention in further detail without limiting its scope.

EXAMPLE 1

Production of small aluminum plates coated so as to adhere securely

Aluminum plates 25×25×0.5 mm in size were dipped into a flux suspension (15% by weight potassium fluoroaluminate flux/85% by weight water/wetting agent) and in this manner were wetted with the flux suspension. The water was evaporated at approximately 150° C., so that a continuous white flux layer remained on the plate. Without further treatment, this coating could be wiped off easily; it was therefore a loosely adhering powder layer. The coated aluminum plates were then tempered at a temperature of approximately 520° C. for approximately 30 seconds. In so doing, the loosely adhering powder layer was converted by sintering of the flux layer into a securely adhering flux layer highly resistant to mechanical stress.

EXAMPLE 2

Coating with solder metal and flux

Example 1 was repeated. This time, a suspension was used which contained 15% by weight potassium fluoroaluminate flux, 8% by weight silicon powder (as solder metal) and 77% by weight water with some wetting agent. The aluminum plates were treated with the suspension as described above. Aluminum plates were obtain ed which were coated with a mechanically securely adhering flux layer containing silicon powder.

EXAMPLE 3

Use of the coated aluminum plates for the production of metal structures 3.1. Use of aluminum plates from Example 1

An aluminum plate from Example 1 was bent such that it formed the letter "V". The bent plate was laid on an unbent aluminum plate from Example 1 such that the bend line of the bent plate was arranged perpendicular to the surface of the unbent plate. A globule of solder metal was laid in the immediate vicinity of the contact surface between the two aluminum plates. The structure formed was placed in a soldering furnace and heated to a temperature just above the melting point of the solder, which was about 572° C. It was possible to observe through the transparent soldering furnace how first the sintered flux melted, followed by the solder metal. After cooling, it was established that the flux had imparted such good flow properties to the solder metal, and that the entire contact surfaces of the two aluminum plates were soldered together.

3.2. Use of aluminum plates from Example 2

Example 3.1 was repeated, but the addition of a solder metal was omitted. Here too, a metal structure was produced which was soldered together very well.

The examples show that a securely adhering flux layer which is very resistant to mechanical stress can be produced by sintering the flux layer, and that the sintered flux layer unexpectedly retains its solder-promoting properties.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. An individual, unassembled metal component having a binder-free, adherent, sintered flux coating thereon, said flux coating sintered on the component at a temperature in the range from 70° C. below the flux melting point to 3° C. below the flux melting point.

2. A metal component according to claim 1, wherein said flux coating is composed of potassium salts of fluoroaluminates.

3. A metal component according to claim 2, wherein said potassium salts of fluoroaluminates comprise at least one fluoroaluminate selected from the group consisting of potassium tetrafluoroaluminate, dipotassium pentafluoroaluminate, and hydrates thereof.

4. A metal component according to claim 3, wherein said flux coating is composed of a mixture of potassium tetrafluoroaluminate and dehydrated dipotassium pentafluoroaluminate.

5. A metal component according to claim 4, wherein said flux coating is composed of a mixture of potassium tetrafluoroaluminate and irreversibly dehydrated dipotassium pentafluoroaluminate.

6. A metal component according to claim 1, wherein the metal component further comprises a solder metal.

7. A metal component according to claim 6, wherein the solder metal is contained in the flux coating.

8. A metal component according to claim 6, wherein the solder metal is arranged as a coating between the flux coating and the metal component.

9. A metal component according claim 1, wherein said flux coating is present only in regions of the metal component which are to be joined to other metal components by soldering.

10. A metal component according to claim 1, wherein said flux coating comprises 60 to 90% by weight potassium tetrafluoroaluminate, 10 to 40% by weight dipotassium pentafluoroaluminate and/or dipotassium pentafluoroaluminate hydrate, and 0 to 5% by weight tripotassium hexafluoroaluminate.

11. A metal component according to claim 10, wherein said flux coating further comprises solder metal.

12. A metal component according to claim 10, wherein said flux further comprises an auxiliary metal which modifies the surface properties of the soldered parts or the resulting eutectic.

13. A metal structure produced by soldering together a plurality of metal components according to claim 1.

14. A method for producing a metal component having a binder-free, adherent, sintered flux coating thereon, said method comprising the steps of:

applying the flux to an individual, unassembled metal component, and thereafter heating the individual, unassembled metal component with the flux applied thereto at a temperature in the range from 70° C. below the flux melting temperature to 3° C. below the flux melting temperature and for a time sufficient to form a sintered, adherent, binder-free flux coating on the metal component without melting.

15. A method of producing a soldered metal structure comprising the steps of placing a plurality of individual metal components coated with solder and a binder-free adherent sintered flux coating sintered at a temperature in the range from 70° C. below the flux melting temperature to 3° C. below the flux melting temperature in contact with each other, and heating the components in contact with each other to solder them together.

* * * * *